E. W. BEARDSLEY & P. W. HAM.
SUBMARINE CABLE.
APPLICATION FILED MAR. 11, 1916.
1,259,344. Patented Mar. 12, 1918.
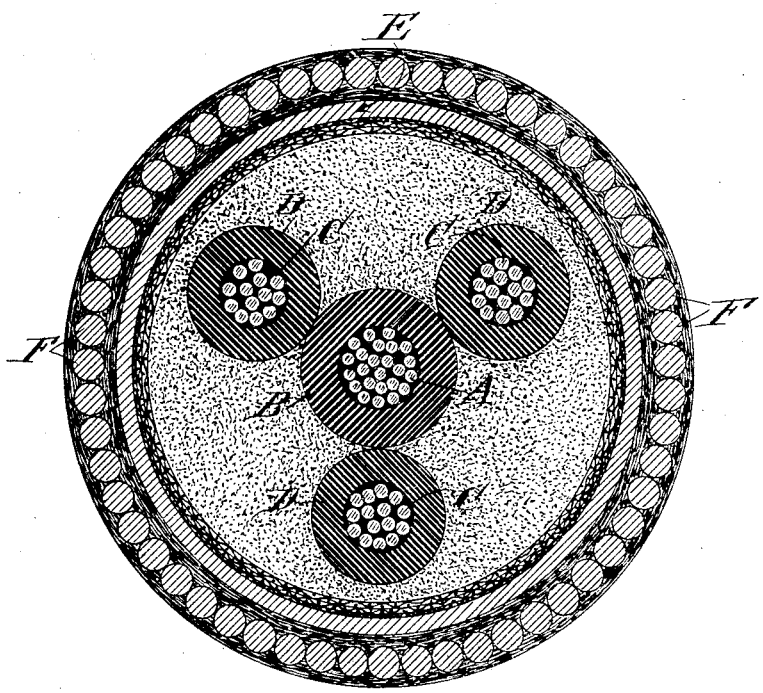
Witnesses
Inventors
Edwin W. Beardsley
Philip W. Ham
By Strong & Townsend
Att'ys

UNITED STATES PATENT OFFICE.

EDWIN WILLIS BEARDSLEY, OF SAN FRANCISCO, AND PHILIP WINTHROP HAM, OF OAKLAND, CALIFORNIA.

SUBMARINE CABLE.

1,259,344.  Specification of Letters Patent.  Patented Mar. 12, 1918.

Application filed March 11, 1916. Serial No. 83,514.

*To all whom it may concern:*

Be it known that we, EDWIN W. BEARDSLEY, of the city and county of San Francisco, State of California, and PHILIP W. HAM, of Oakland, county of Alameda, State of California, citizens of the United States, have invented new and useful Improvements in Submarine Cables, of which the following is a specification.

This invention relates to submarine cables for the transmission of electric currents.

In a submarine cable it is very desirable to relieve the electric conductors from all mechanical strains. In the types of cables now in use the armor wires being spirally wrapped and insulating materials being compressible, tend to straighten out when tension is applied to them. This throws stress upon the lead sheath which metal on account of its ductility will stretch and throw the stress onto the electric conductors. These electric conductors are spirally wrapped and are, therefore, not adapted to take the stress. All this distortion and movement between the component parts of the cable are injurious and to be avoided.

The invention aims to overcome the foregoing objections which in brief is accomplished by the employment of a straight central cable formed of steel, or bronze or the like about which the electric conductors are spirally wrapped, the latter being inclosed in a lead sheath and the sheath in turn being inclosed in steel or the like armor wires, whereby the central cable and the armor wires provide conjointly acting inner and outer stress relievers.

In the accompanying drawings is shown a cross-section of a cable embodying our invention.

The complete cable as shown comprises a supporting member A of steel, bronze or other suitable material surrounded by a belt of insulation B. Around this insulated center cable the electric conductors C are spirally wrapped, each being properly insulated from the other. The number, size and arrangement of the electric conductors will vary greatly in different cables, from a few conductors of large size, such as the three conductor power cables shown in the sketch, to a large number of conductors of comparatively small size, such as a telephone or telegraph cable.

Around the electric conductors is placed the proper thickness of insulation D over which comes a lead sheath E which insures water tightness. The lead sheath is protected from mechanical injury by the steel armor wires F which are spirally and wrapped covered at the joints. A strong splice can be easily made in this center cable which in conjunction with the armor wires F will take all the stress and eliminate the possibility of the electric conductors being pulled apart at the splice. The armor wires F also protect the lead sheath against abrasion and injury and assume mechanical strain in conjunction with the central cable A, thus providing inner and outer stress relievers.

Having thus described our invention, what we claim and desire to secure by Letters Patent is—

1. A submarine cable for the transmission of electric currents composed of a central metallic supporting cable covered with insulation, a plurality of electric conductors spirally wrapped around said supporting cable, said conductors being each covered with insulation, a lead sheath inclosing said conductors and supporting cable to provide a water tight casing therefor, and steel armor wires spirally wrapped around the lead sheath and having their joints covered, said supporting cable and said steel armor wires providing conjointly acting inner and outer stress relievers for the conductors.

2. A submarine cable for the transmission of electric currents composed of a central metallic supporting cable covered with insulation, a plurality of electric conductors spirally wrapped around said supporting cable, said conductors being each covered with insulation, a lead sheath inclosing said conductors and supporting cable to provide a water tight casing therefor, and armor wires wrapped around the cable, said central cable and said steel armor wires providing conjointly acting inner and outer stress relievers for the conductors.

In testimony whereof we have hereunto set our hands.

EDWIN WILLIS BEARDSLEY.
PHILIP WINTHROP HAM.

Witnesses:
THOS. J. SPELLMAN,
E. A. CIELLIN.

Copies of this patent may be obtained for five cents each, by addressing the "Commissioner of Patents Washington, D. C."